US010975942B1

(12) United States Patent
Soffner et al.

(10) Patent No.: US 10,975,942 B1
(45) Date of Patent: Apr. 13, 2021

(54) AXLE ASSEMBLY HAVING A DIFFERENTIAL ASSEMBLY

(71) Applicant: ArvinMeritor Technology, LLC, Troy, MI (US)

(72) Inventors: Rodrigo Soffner, Osasco (BR); Gumercindo Furtado, Osasco (BR); Fernando Martinez, Osasco (BR); Egidio Correia, Osasco (BR)

(73) Assignee: ArvinMeritor Technology, LLC, Troy, MI (US)

( * ) Notice: Subject to any disclaimer, the term of this patent is extended or adjusted under 35 U.S.C. 154(b) by 7 days.

(21) Appl. No.: 16/598,470

(22) Filed: Oct. 10, 2019

(51) Int. Cl.
| | | |
|---|---|---|
| *F16H 37/08* | (2006.01) | |
| *F16H 48/38* | (2012.01) | |
| *F16H 48/08* | (2006.01) | |
| *B60K 17/16* | (2006.01) | |

(52) U.S. Cl.
CPC ......... *F16H 37/082* (2013.01); *B60K 17/165* (2013.01); *F16H 48/08* (2013.01); *F16H 48/38* (2013.01); *F16H 2200/0034* (2013.01); *F16H 2200/2005* (2013.01); *F16H 2702/02* (2013.01); *F16H 2702/04* (2013.01)

(58) Field of Classification Search
CPC ...... F16H 37/082; F16H 48/08; F16H 57/037; F16H 48/20
USPC .................................................. 475/203, 205
See application file for complete search history.

(56) References Cited

U.S. PATENT DOCUMENTS

| | | | |
|---|---|---|---|
| 1,530,205 A | 3/1925 | Ruckstell | |
| 2,053,929 A | 9/1936 | Wiedmaier | |
| 2,132,692 A * | 10/1938 | Lawrence | F16H 48/295 475/233 |
| 3,031,900 A | 5/1962 | Stump | |
| 3,642,097 A * | 2/1972 | Koivunen | F16H 47/08 184/6 |
| 4,520,690 A * | 6/1985 | Dangel | B60K 17/346 180/249 |
| 9,518,642 B1 | 12/2016 | Hirao | |
| 10,364,872 B2 | 7/2019 | Keeney et al. | |
| 10,369,885 B2 | 8/2019 | Keeney et al. | |
| 2019/0054816 A1 | 2/2019 | Garcia et al. | |

OTHER PUBLICATIONS

Extended European Search Report dated Jan. 21, 2021, for related European Appln. No. 20197279.1; 7 Pages.

* cited by examiner

*Primary Examiner* — Derek D Knight
(74) *Attorney, Agent, or Firm* — Brooks Kushman PC

(57) ABSTRACT

An axle assembly having a differential assembly that may include a gear reduction unit, a differential nest, and a coupling. The differential nest may be at least partially received in an inner housing. The inner housing may be rotatable about an axis with respect to an outer housing when the coupling is in a first position. The inner housing may be rotatable about the axis with the outer housing when the coupling is in a second position.

20 Claims, 5 Drawing Sheets

AXLE ASSEMBLY HAVING A DIFFERENTIAL ASSEMBLY

TECHNICAL FIELD

This disclosure relates to an axle assembly having a differential assembly that may include a gear reduction unit and a differential nest.

BACKGROUND

An axle assembly having a differential assembly is disclosed in U.S. Patent Publication No. 2019/0054816.

SUMMARY

In at least one embodiment, an axle assembly is provided. The axle assembly may include a differential assembly, a first axle shaft, and a second axle shaft. The differential assembly may include an outer housing, an inner housing, a gear reduction unit, a coupling, and a differential nest. The outer housing may have a first side gear that may be rotatable about an axis. The inner housing may be at least partially received inside the outer housing. The gear reduction unit may operatively connect the outer housing to the inner housing. The gear reduction unit may include a spider, a second side gear, and a pinion gear. The spider may be fixedly disposed on the inner housing. The second side gear may be rotatable about the axis. The pinion gear may be rotatably disposed on the spider and may mesh with the first side gear and the second side gear. The coupling may be movable between a first position and a second position. The coupling may inhibit or prevent rotation of the first side gear with respect to the second side gear when the coupling is in the first position. The coupling may inhibit or prevent rotation of the spider with respect to the second side gear when the coupling is in the second position. The differential nest may be at least partially received in the inner housing. The first and second axle shafts may be rotatable about the axis and may extend from the differential nest.

In at least one embodiment, an axle assembly is provided. The axle assembly may include a differential assembly. The differential assembly may include an outer housing, an inner housing, a gear reduction unit, a differential nest, and a coupling. The outer housing may have a first side gear that may be rotatable about an axis. The inner housing may be partially received inside the outer housing and may be rotatable about the axis. The gear reduction unit may operatively connect the first side gear to the inner housing. The differential nest may be at least partially received in the inner housing. The differential nest may be operatively connected to first and second axle shafts. The coupling may be received in the gear reduction unit. The inner housing may not be rotatable about the axis with respect to the outer housing when the coupling is in a first position. The inner housing may be rotatable about the axis with the outer housing when the coupling is in a second position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
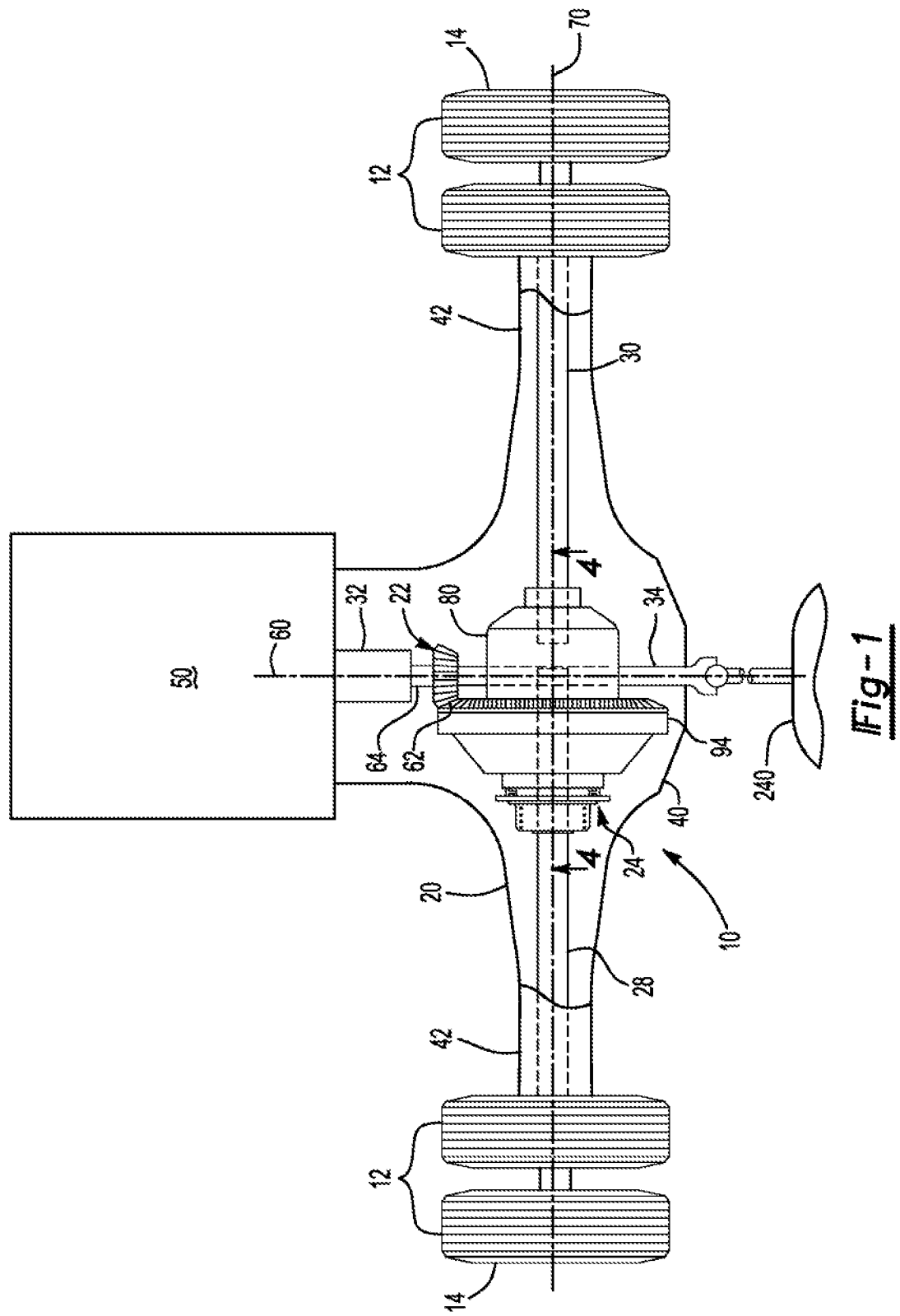
FIG. 1 is a schematic representation of an axle assembly having a differential assembly and an example of a power source.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire 12 mounted on a wheel 14. One or more axle assemblies may be provided with the vehicle. In at least one configuration, the axle assembly 10 may include a housing assembly 20, a drive pinion 22, a differential assembly 24, an actuator 26 (shown in FIG. 4), a first axle shaft 28, and a second axle shaft 30. Optionally, the axle assembly 10 may also include an interaxle differential unit 32 and an output shaft 34.

The housing assembly 20 may facilitate mounting of the axle assembly 10 to the vehicle. In addition, the housing assembly 20 may receive various components of the axle assembly 10. For example, the housing assembly 20 or a differential carrier of the housing assembly 20 may receive and support the differential assembly 24. Optionally, the housing assembly 20 may support the axle shafts 28, 30 and, if provided, the interaxle differential unit 32 and output shaft 34. In at least one configuration, the housing assembly 20 may include a center portion 40 and an arm portion 42.

The center portion 40 may be disposed proximate the center of the housing assembly 20. The center portion 40 may at least partially define a cavity that may receive the differential assembly 24. A lower region of the center portion 40 may at least partially define a sump portion that may contain lubricant that may be splashed to lubricate internal components of the axle assembly 10, such as the differential assembly 24 and its associated bearings.

The center portion 40 may also facilitate mounting of various external components. For instance, the center portion 40 may facilitate mounting of a power source 50 to the housing assembly 20 or may facilitate mounting of one or more intermediate components that may be disposed between the power source 50 and the center portion 40, such as a differential carrier.

The power source 50 may provide torque to the axle assembly 10 and may have any suitable configuration. For instance, the power source 50 may be an engine, such as an internal combustion engine that may be remotely positioned from the housing assembly 20 and may provide torque to the axle assembly 10 via intermediate components such as a transmission and a drive shaft. As another example, the power source 50 may be an electric motor that may be remotely positioned from the housing assembly 20 or may be disposed adjacent to and may be directly mounted to the housing assembly 20 as shown in FIG. 1.

One or more arm portions 42 may extend from the center portion 40. For example, two arm portions 42 may extend in opposite directions from the center portion 40 and away from the differential assembly 24. The arm portions 42 may have substantially similar configurations. For example, the arm portions 42 may each have a hollow configuration or tubular configuration that may extend around the corresponding axle shaft 28, 30 and may help separate or isolate the axle shaft 28, 30 from the surrounding environment. Each arm portion 42 may define an arm cavity that may receive a corresponding axle shaft 28, 30. It is also contemplated that the arm portions 42 may be omitted.

The drive pinion 22 may be at least partially received in the housing assembly 20. The drive pinion 22 may be operatively connected to the power source 50. As such, the drive pinion 22 may help operatively connect the power source 50 to components of the axle assembly 10, such as the differential assembly 24. The drive pinion 22 may extend along and may be rotatable about a drive pinion axis 60. The drive pinion 22 may be directly connected or indirectly connected to the power source 50. In the configuration shown in FIG. 1, the drive pinion 22 may be provided with or may be directly coupled to an output of the power source 50, such as an output shaft of an electric motor. In such a configuration, the drive pinion 22 may extend from the power source 50. The drive pinion 22 may also be indirectly coupled to an output of the power source 50, such as via a transmission, drive shaft, universal joint, other intermediate component, or combinations thereof. In at least one configuration such as is shown in FIG. 1, the drive pinion 22 may include a gear portion 62 and optionally a shaft portion 64.

The gear portion 62 may be disposed at or near an end of the drive pinion 22. The gear portion 62 may have a plurality of teeth that may mate or mesh with corresponding teeth on a ring gear of the differential assembly 24 as will be discussed in more detail below. As such, the drive pinion 22 may provide torque from the power source 50 to the ring gear of the differential assembly 24.

The shaft portion 64, if provided, may be operatively connected to the power source 50. The shaft portion 64 may extend from the gear portion 62 in a direction that may extend toward the power source 50. The shaft portion 64 may be integrally formed with the gear portion 62 or may be provided as a separate component that may be fixedly coupled to the gear portion 62.

Figure 2:
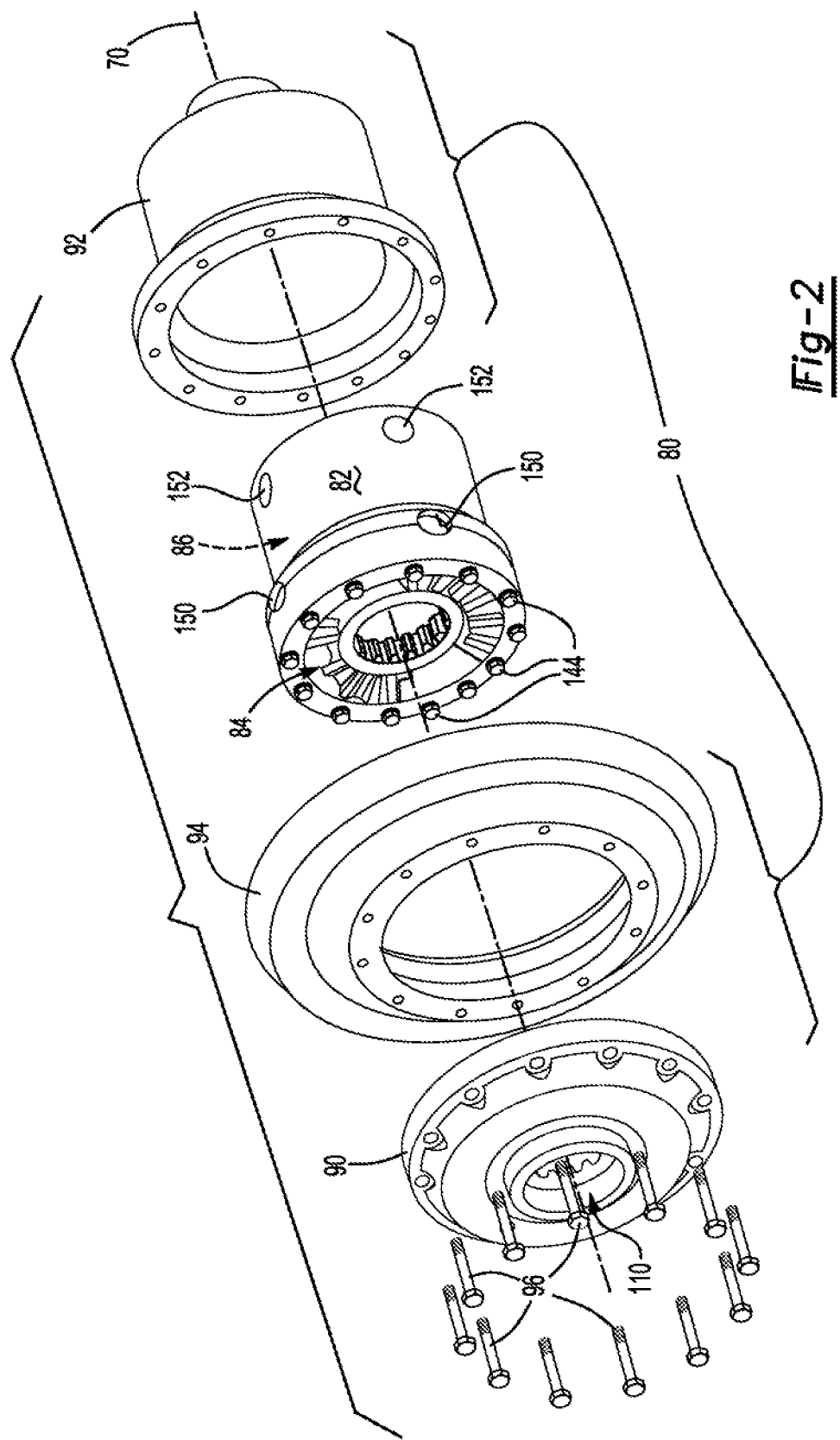
FIG. 2 is a partially exploded view of a portion of the differential assembly.

Referring to FIGS. 1 and 2, the differential assembly 24 may be at least partially received in the center portion 40 of the housing assembly 20. The differential assembly 24 may transmit torque to the vehicle traction wheel assemblies and permit the traction wheel assemblies to rotate at different velocities. For example, the differential assembly 24 may be operatively connected to the first and second axle shafts 28, 30 and may permit the first and second axle shafts 28, 30 to rotate at different rotational speeds about the axis 70. In at least one configuration and as is best shown in FIGS. 2 and 4, the differential assembly 24 may include an outer housing 80, an inner housing 82, a gear reduction unit 84, a differential nest 86, and a coupling 88.

The outer housing 80 may be received in the housing assembly 20. For example, the outer housing 80 may be rotatably supported on a differential carrier of the housing assembly 20 and may be rotatable about the axis 70 with respect to the housing assembly 20. The outer housing 80 may at least partially receive components of the differential assembly 24 such as the inner housing 82, the gear reduction unit 84, the differential nest 86, the coupling 88, or combinations thereof. The outer housing 80 may have a multi piece construction that may facilitate assembly and positioning of components inside the outer housing 80. In the configuration shown, a three-piece outer housing 80 is depicted; however, it is contemplated that the outer housing 80 may have a greater or lesser number of pieces. In a three-piece configuration as shown, the outer housing 80 may include a first outer housing 90, a second outer housing 92, and a ring gear 94. These components may cooperate to define a cavity that may receive the inner housing 82. The first outer housing 90, the second outer housing 92, and the ring gear 94 may be fastened together in any suitable manner, such as with one or more fasteners 96, such as bolts.

Figure 3:
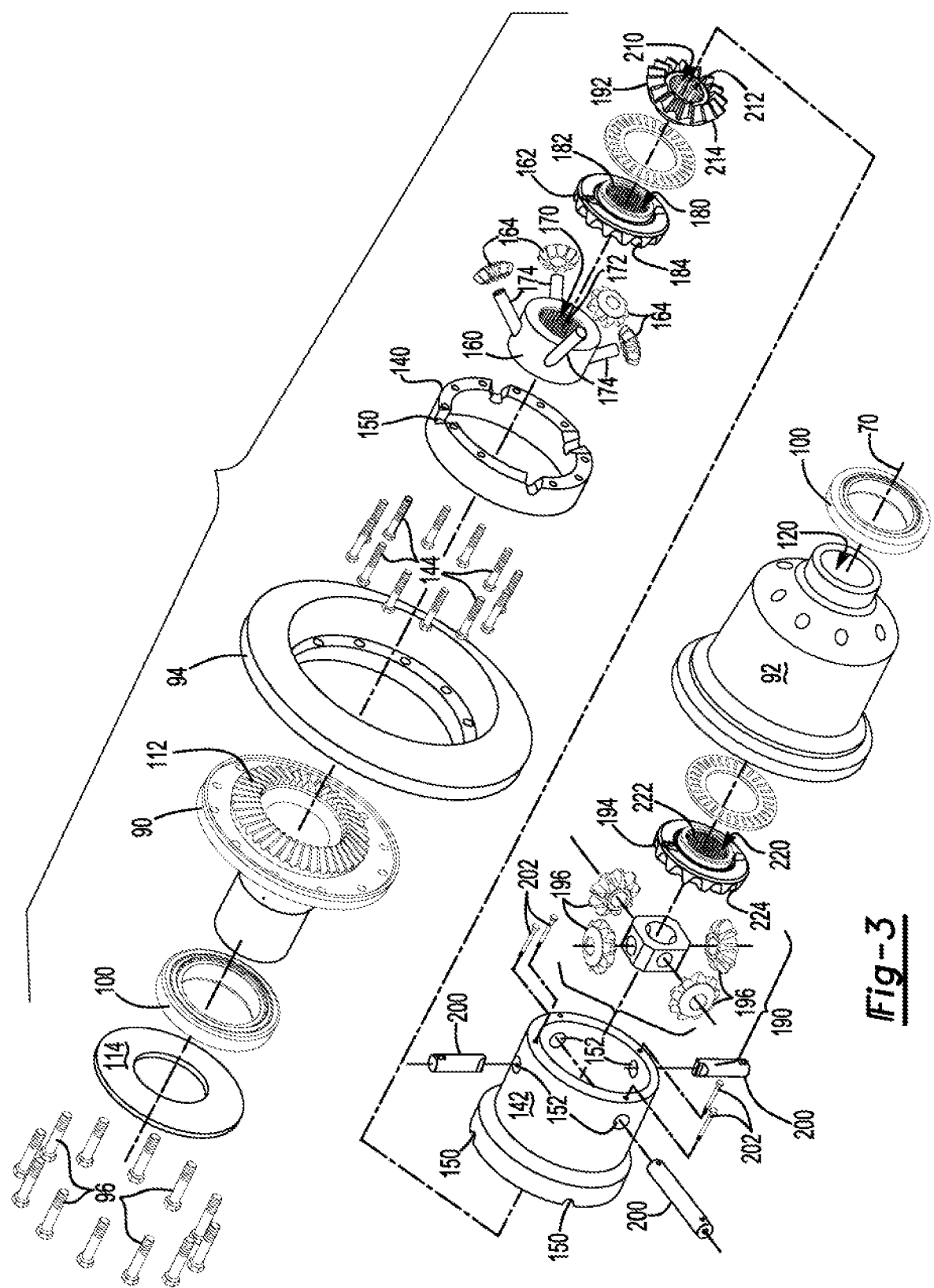
FIG. 3 is an exploded view of the portion of the differential assembly shown in FIG. 2.
Figure 4:
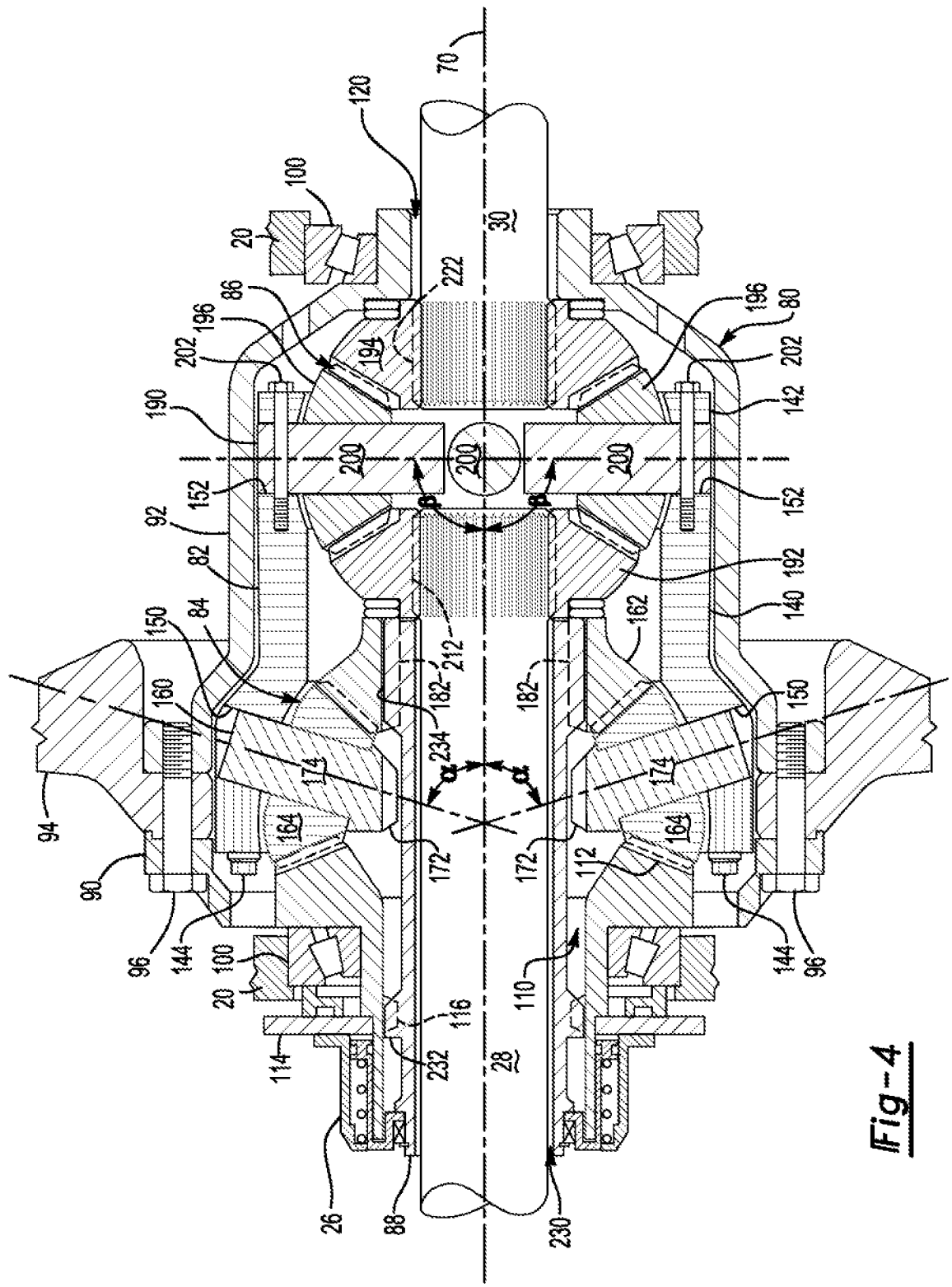
FIG. 4 is a section view of the differential assembly along section line 4-4 showing a coupling in a first position.

Referring to FIGS. 2-4, the first outer housing 90 may be disposed proximate a first end of the outer housing 80. The first outer housing 90 may receive a portion of the gear reduction unit 84 and may be rotatably supported on a roller bearing assembly 100, which is best shown in FIG. 4. The roller bearing assembly 100 may have any suitable configuration. For instance, the roller bearing assembly 100 may include a plurality of rolling elements that may be disposed between an inner race and an outer race. The inner race may receive and may be mounted to the first outer housing 90. The outer race may extend around the inner race and may be mounted to the housing assembly 20. The first outer housing 90 may at least partially define a first side hole 110 and may have a first side gear 112 and a clutch plate 114.

The first side hole 110 may extend through the first outer housing 90 and may extend around the axis 70. The first side hole 110 may receive the first axle shaft 28 and the coupling 88.

Referring to FIGS. 3 and 4, the first side gear 112 may be rotatable about the axis 70 with the outer housing 80. The first side gear 112 may be integrally formed with the first outer housing 90 or may be provided as a separate component that is fixed to the first outer housing 90 such that the first side gear 112 is rotatable about the axis 70 with the first outer housing 90. The first side gear 112 may include a set of teeth that may face toward the gear reduction unit 84. The set of teeth may be arranged around the axis 70 and may mesh with at least one pinion gear of the gear reduction unit 84 as will be discussed in more detail below.

Optionally, a clutch plate 114 may be coupled to the first outer housing 90. The clutch plate 114 may be provided as a separate component from the first outer housing 90. For instance, the clutch plate 114 may be provided as a separate component to facilitate installation of the roller bearing assembly 100. The clutch plate 114 may extend from the first outer housing 90 in a direction that extends away from the gear reduction unit 84. The clutch plate 114 may extend from or further define the first side hole 110.

Referring to FIG. 4, the first outer housing 90 may include a spline 116. The spline 116 may be axially positioned between the first side gear 112 and the clutch plate 114. The spline 116 may include a plurality of teeth that may be received in the first side hole 110. The teeth may extend toward the axis 70 and may be arranged around the axis 70. The teeth may be disposed substantially parallel to the axis 70 and may selectively mate with a corresponding spline on the coupling 88 as will be discussed in more detail below.

The second outer housing 92 may be disposed opposite the first outer housing 90. The second outer housing 92 may receive at least a portion of the gear reduction unit 84 and the differential nest 86. The second outer housing 92 may be rotatably supported on another roller bearing assembly 100. The second outer housing 92 may at least partially define a second side hole 120. The second side hole 120 may extend through the second outer housing 92 and may extend around the axis 70. The second axle shaft 30 may extend through the second side hole 120.

The ring gear 94 may be mounted to the first outer housing 90, the second outer housing 92, or both. For example, the ring gear 94 may be disposed between and may be mounted to the first outer housing 90 and the second outer housing 92. Alternatively, the ring gear 94 may be mounted to the first outer housing 90 or the second outer housing 92 such that the ring gear 94 is not disposed between the first outer housing 90 and the second outer housing 92. The ring gear 94 may be mounted to the first outer housing 90 and/or the second outer housing 92 in any suitable manner, such as by welding or with one or more fasteners 96, such as bolts. As such, the first outer housing 90, the second outer housing 92, and the ring gear 94 may be rotatable together about the axis 70. The ring gear 94 may have a set of teeth that may be arranged around the axis 70 that may mate or mesh with teeth of the gear portion 62 of the drive pinion 22. Accordingly, torque may be transmitted between the power source 50 and the ring gear 94 via the drive pinion 22. The teeth of the ring gear 94 may face away from the first outer housing 90, however, it is contemplated that the tooth orientation may be changed or reversed.

Referring to FIGS. 2-4, the inner housing 82 may be at least partially received in the outer housing 80. For example, the inner housing 82 is completely received in the outer housing 80. The inner housing 82 may be rotatable about the axis 70. More specifically, the inner housing 82 may be rotatable about the axis 70 with respect to the outer housing 80 depending on the position of the coupling 88 as will be discussed in more detail below. The inner housing 82 may receive components of the gear reduction unit 84, the differential nest 86, or both. In addition, the inner housing 82 may have a multipiece construction that may facilitate assembly or positioning of the gear reduction unit 84 and/or the differential nest 86 inside the inner housing 82. In the configuration shown, a two-piece case is depicted; however, it is contemplated that the inner housing 82 may have a greater or lesser number of pieces. In a two-piece configuration, the inner housing 82 may include a first inner housing portion 140 and a second inner housing portion 142. The first inner housing portion 140 and the second inner housing portion 142 may be fastened together in any suitable manner, such as with one or more fasteners 144, such as bolts.

Referring to FIGS. 3 and 4, the first inner housing portion 140 may receive at least a portion of the gear reduction unit 84. The first inner housing portion 140 may include or may cooperate with the second inner housing portion 142 to define one or more spider holes 150 that may receive pins of a spider that may be provided with the gear reduction unit 84 as will be discussed in more detail below.

The second inner housing portion 142 may extend from an end of the first inner housing portion 140. The second inner housing portion 142 may at least partially receive the differential nest 86. The second inner housing portion 142 may define one or more differential spider holes 152 that may receive pins of a spider that may be provided with the differential nest 86 as will be discussed in more detail below.

The gear reduction unit 84 may alter the torque that is transmitted between the outer housing 80 and the differential nest 86 depending on the positioning of the coupling 88 as will be discussed in more detail below. For example, the gear reduction unit 84 may provide different drive gear ratios to the differential nest 86, such as a first drive gear ratio and a second drive gear ratio. The first drive gear ratio, which may be referred to as a low-speed or low range drive gear ratio, may provide gear reduction from the outer housing 80 to the differential nest 86 (and hence to the first and second axle shafts 28, 30 of the axle assembly 10). As a nonlimiting example, the first drive gear ratio may provide a 1.4:1 gear ratio or more. The first drive gear ratio may provide increased torque to a vehicle traction wheel as compared to the second drive gear ratio. The second drive gear ratio, which may be referred to as a high-speed or high range drive gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy.

The gear reduction unit 84 may operatively connect the outer housing 80 to the inner housing 82. For instance, the gear reduction unit 84 may operatively connect the first side gear 112 to the inner housing 82. As is best shown in FIG. 4, the gear reduction unit 84 may be at least partially received inside the outer housing 80, the inner housing 82, and optionally the ring gear 94. The gear reduction unit 84 may be a bevel gear reduction unit the employs bevel gears rather than other gear configurations, such as a planetary gear set. In at least one configuration, the gear reduction unit 84 may include a spider 160, a second side gear 162, and at least one pinion gear 164.

The spider 160 may be fixedly disposed on the inner housing 82. The spider 160 may be axially positioned between the first side gear 112 and the differential nest 86. As such, the first side gear 112 may be axially positioned between the spline 116 and the spider 160 of the gear reduction unit 84. In at least one configuration, the spider 160 may include a spider hole 170, a spider spline 172, and one or more spider pins 174.

Referring to FIG. 3, the spider hole 170 may be a through hole that may extend through the spider 160. The first axle shaft 28 and the coupling 88 may extend through the spider hole 170.

Referring to FIGS. 3 and 4, the spider spline 172 may be received in the spider hole 170. The spider spline 172 may include a plurality of teeth. The teeth may extend toward the axis 70 and may be arranged around the axis 70. The teeth may be disposed substantially parallel to the axis 70 and may selectively mate with a corresponding spline on the coupling 88.

One or more spider pins 174 may extend away from the axis 70 and the spider hole 170. Four spider pins 174 are shown; however, it is contemplated that a greater or lesser number of spider pins 174 may be provided. Each spider pin 174 may extend along a spider pin axis that may be disposed at a first angle α with respect to the axis 70. In at least one configuration, the first angle α may be an oblique angle that may be disposed in a nonparallel and non-perpendicular relationship with the axis 70. As a nonlimiting example, the first angle α may be between 50° and 85°.

The second side gear 162 may be rotatable about the axis 70. The second side gear 162 may be disposed on the coupling 88 and may be configured as a bevel gear. For example, the second side gear 162 may have a second side gear hole 180, a second side gear spline 182, and a set of teeth 184.

The second side gear hole 180 may be a through hole that may extend through the second side gear 162. The second side gear hole 180 may receive the coupling 88.

The second side gear spline 182 may be received in the second side gear hole 180. The second side gear spline 182 may include a plurality of teeth. The teeth may extend toward the axis 70 and may be arranged around the axis 70. The teeth may be disposed substantially parallel to the axis 70 and may mate with a corresponding spline on the coupling 88. As such, the second side gear 162 may not rotate about the axis 70 with respect to the coupling 88, but the coupling 88 may be movable in an axial direction with respect to the second side gear 162.

The set of teeth 184 that may face toward the first side gear 112. The set of teeth 184 may be arranged around the axis 70 and may mesh with at least one pinion gear 164.

A pinion gear 164 may be rotatably disposed on the spider 160. For example, a pinion gear 164 may be rotatably disposed on a corresponding spider pin 174 and may be configured as a bevel gear. The pinion gear 164 may have teeth that may mesh with teeth of the first side gear 112 and the second side gear 162.

The differential nest 86 may operatively connect the inner housing 82 to the first and second axle shafts 28, 30. Moreover, the differential nest 86 may permit the first and second axle shafts 28, 30 to rotate at different rotational speeds about the axis 70. The differential nest 86 may be at least partially received in the outer housing 80 and the inner housing 82. Optionally, the differential nest 86 may be axially positioned such that the differential nest 86 is not received in the ring gear 94. In at least one configuration, the differential nest 86 may include a differential spider 190, a first differential side gear 192, a second differential side gear 194, and one or more differential pinion gears 196.

The differential spider 190 may be fixedly disposed on the inner housing 82. The differential spider 190 may be axially positioned between the first differential side gear 192 and the second differential side gear 194 and may be received between the first inner housing portion 140 and the second inner housing portion 142. In at least one configuration, the differential spider 190 may include one or more differential spider pins 200.

The differential spider pins 200 may extend away from the axis 70. Four differential spider pins 200 are shown; however, it is contemplated that a greater or lesser number of differential spider pins 200 may be provided. Each differential spider pin 200 may extend along a differential spider pin axis that may be disposed at a second angle β with respect to the axis 70. The second angle β may differ from the first angle α. For instance, the second angle β may be greater than the first angle α. In at least one configuration, the differential spider pin 200 may be disposed perpendicular to the axis 70 and the second angle β may be 90°. Each differential spider pin 200 may be received in a differential spider hole 152 of the inner housing 82. In addition, a differential spider pin 200 may be fixedly coupled to the inner housing 82, such as with the fasteners 202.

The first differential side gear 192 may be rotatable about the axis 70 and may be received in the inner housing 82. For example, the first differential side gear 192 may be axially positioned between the second side gear 162 of the gear reduction unit 84 and the differential spider 190. The first differential side gear 192 may be fixed to the first axle shaft 28 in any suitable manner. In at least one configuration, the first differential side gear 192 may include a first differential side gear hole 210, a first differential side gear spline 212, and a set of teeth 214.

The first differential side gear hole 210 may be a through hole that may extend through the first differential side gear 192. The first differential side gear hole 210 may receive the first axle shaft 28.

The first differential side gear spline 212 may be received in the first differential side gear hole 210. The first differential side gear spline 212 may include a plurality of teeth. The teeth may extend toward the axis 70 and may be arranged around the axis 70. The teeth may mate with a corresponding spline on the first axle shaft 28. As such, the first differential side gear 192 may rotate about the axis 70 with the first axle shaft 28.

The set of teeth 214 that may face toward the second differential side gear 194. The set of teeth 214 may be arranged around the axis 70 and may mesh with at least one differential pinion gear 196.

The second differential side gear 194 may have the same configuration or substantially similar configuration to the first differential side gear 192. The second differential side gear 194 may be rotatable about the axis 70 and may be received in the outer housing 80 and/or the inner housing 82. For example, the second differential side gear 194 may be axially positioned between the differential spider 190 and a roller bearing assembly 100 that is mounted to the second outer housing 92. The second differential side gear 194 may be fixed to the second axle shaft 30 in any suitable manner. In at least one configuration, the second differential side gear 194 may include a second differential side gear hole 220, a second differential side gear spline 222, and a set of teeth 224.

The second differential side gear hole 220 may be a through hole that may extend through the second differential side gear 194. The second differential side gear hole 220 may receive the second axle shaft 30.

The second differential side gear spline 222 may be received in the second differential side gear hole 220. The second differential side gear spline 222 may include a plurality of teeth. The teeth may extend toward the axis 70 and may be arranged around the axis 70. The teeth may mate with a corresponding spline on the second axle shaft 30. As such, the second differential side gear 194 may rotate about the axis 70 with the second axle shaft 30.

The set of teeth 224 that may face toward the first differential side gear 192. The set of teeth 214 may be arranged around the axis 70 and may mesh with at least one differential pinion gear 196.

A differential pinion gear 196 may be rotatably disposed on the differential spider 190. For example, a differential pinion gear 196 may be rotatably disposed on a corresponding differential spider pin 200. The differential pinion gear 196 may have teeth that may mesh with the first differential side gear 192 and the second differential side gear 194.

Referring to FIG. 4, the coupling 88 may be at least partially received inside the outer housing 80, the inner housing 82, and the gear reduction unit 84. For example, the coupling 88 may extend through or may be received in the first side hole 110, the spider hole 170 of the spider 160 of the gear reduction unit 84, and the second side gear hole 180 of the second side gear 162 of the gear reduction unit 84. In addition, the coupling 88 may be movable along the axis 70. For example, the coupling 88 may move axially or move along the axis 70 between a first position and a second position as will be discussed in more detail below. The coupling 88 may have a hollow tubular configuration and may include a coupling hole 230, a first coupling spline 232, and a second coupling spline 234.

The coupling hole 230 may extend through the coupling 88 and may extend around the axis 70. The coupling hole 230 may receive the first axle shaft 28.

The first coupling spline 232 may be disposed opposite the coupling hole 230. For example, the first coupling spline 232 may include a plurality of teeth that may be arranged around the axis 70 and the coupling hole 230 such that the teeth may face away from axis 70. The teeth of the first coupling spline 232 may extend away from the axis 70 and the coupling hole 230 and may selectively engage with the spline 116 of the clutch plate 114.

The second coupling spline 234 may be disposed opposite the coupling hole 230. For example, the second coupling spline 234 may include a plurality of teeth that may be arranged around the axis 70 and the coupling hole 230 such that the teeth may face away from and may extend away from the axis 70. The teeth of the second coupling spline 234 may extend away from the axis 70 and the coupling hole 230 such that the second coupling spline 234 may mesh with the second side gear spline 182 and may selectively mesh with the spider spline 172. Such meshing is best understood with reference to FIGS. 4 and 5.

Referring to FIG. 4, the coupling 88 is shown in the first position. The coupling 88 may prevent rotation of the second side gear 162 with respect to first side gear 112 when the coupling 88 is in the first position. For example, the first coupling spline 232 of the coupling 88 may mesh with the spline 116 and the second coupling spline 234 meshes with the second side gear spline 182 when the coupling 88 is in the first position. As such, the first side gear 112 and the second side gear 162 may rotate together about the axis 70. The second coupling spline 234 may be spaced apart from and may not mesh with the spider spline 172 of the spider 160 of the gear reduction unit 84 when the coupling 88 is in the first position. As such, the spider 160 and the inner housing 82 may be rotatable about the axis 70 when the coupling 88 is in the first position. The pinion gear 164 may not be rotatable about a corresponding spider pin 174 when the coupling 88 is in the first position. Thus, the inner housing 82 may rotate with the outer housing 80 about the axis 70 (i.e., the inner housing 82 may be inhibited or prevented from rotating with respect to the outer housing 80) when the coupling is in the first position. Accordingly, the gear reduction unit 84 may increase the torque that is transmitted from the outer housing 80 to the differential nest 86 and decrease the rotational speed of the inner housing 82 and the axle shafts 28, 30 when the coupling 88 is in the first position as compared to the second position at a given or constant ring gear rotational speed. The positioning of the coupling 88 may not affect operation of the differential nest 86. For example, the differential pinion gear 196 may be rotatable about the differential spider pin 200 to allow the first differential side gear 192 and the second differential side gear 194 and their associated axle shafts 28, 30 to rotate and potentially rotate at different speeds when the coupling 88 is in the first position.

Figure 5:
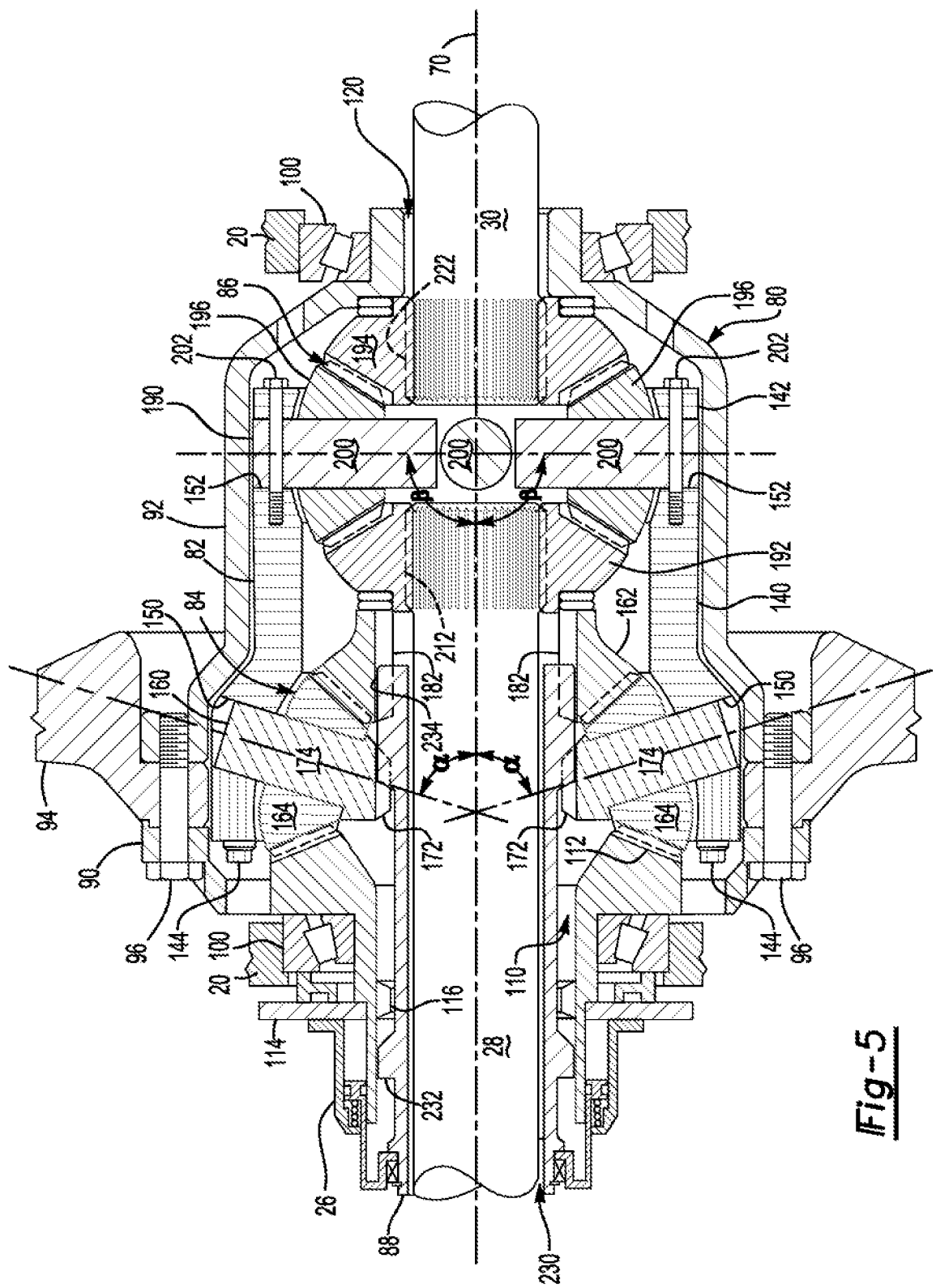
FIG. 5 is a section view of the differential assembly along section line 4-4 showing the coupling in a second position.

Referring to FIG. 5, the coupling 88 is shown in the second position. The coupling 88 may prevent rotation of the spider 160 with respect to the second side gear 162 when the coupling 88 is in the second position. For example, the first coupling spline 232 of the coupling 88 may be spaced apart from the spline 116 when the coupling 88 is in the second position. The second coupling spline 234 may remain meshed with the second side gear spline 182 and may mesh with the spider spline 172 of the spider 160 when the coupling 88 is in the second position. The pinion gear 164 may not be rotatable about the spider pin 174 when the coupling 88 is in the second position since the spider 160 is prevented from rotating with respect to the second side gear 162. As such, the first side gear 112 may be rotatable with respect to the inner housing 82, the spider 160, and the second side gear 162 when the coupling 88 is in the second position. The inner housing 82 may be rotatable about the axis 70 with respect to the outer housing 80 when the coupling 88 is in the second position. The differential pinion gear 196 may remain rotatable about the differential spider pin 200 to allow the first differential side gear 192 and the second differential side gear 194 and their associated axle shafts 28, 30 to rotate and potentially rotate at different speeds when the coupling 88 is in the second position.

Referring to FIGS. 4 and 5, the actuator 26 may be configured to actuate or move the coupling 88 between the first position and the second position. The actuator 26 may be of any suitable type. For example, the actuator 26 may be an electrical, electromechanical, pneumatic, or hydraulic actuator. In at least one configuration, the actuator 26 may move the coupling 88 along the axis 70 when the rotational speed of the coupling 88 and a corresponding spline are sufficiently synchronized to complete a shift between the first and second positions so that the teeth of the first coupling spline 232 may disengage from the spline 116 and the teeth of the second coupling spline 234 may mesh with teeth of the spider spline 172, or so that the teeth of the second coupling spline 234 may disengage from teeth of the spider spline 172 and teeth of the first coupling spline 232 may mesh with teeth of the spline 116. The actuator 26 may be disposed in any suitable location. For example, the actuator 26 may be mounted to the first outer housing 90 or the clutch plate 114 and may extend around and receive the clutch plate 114.

Referring to FIGS. 1 and 2, the first and second axle shafts 28, 30 may transmit torque from the differential assembly 24 to corresponding traction wheel assemblies. For example, the first axle shaft 28 and a second axle shaft 30 may extend in opposite directions from the differential nest 86 and may extend through different arm portions 42 of housing assembly 20. The first axle shaft 28 may extend through the coupling 88. The first and second axle shafts 28 may extend along and may be rotatable about the axis 70. Each axle shaft 28, 30 may have a first end and a second end. The first end may be operatively connected to the differential assembly 24. The second end may be disposed opposite the first end and may be operatively connected to a corresponding wheel end assembly that may have a wheel hub that may support a wheel 14.

Referring to FIG. 1, the interaxle differential unit 32, if provided, may compensate for speed differences between different axle assemblies, such as speed differences between the axle assembly 10 and a second axle assembly 240 that is connected in series with the axle assembly 10. In at least one configuration, the interaxle differential unit 32 may be positioned along or may be rotatable about the drive pinion axis 60. The interaxle differential unit 32 is not the differential assembly 24 and does not permit the traction wheel assemblies or axle shafts 28, 30 of a particular axle assembly to rotate at different velocities.

The output shaft 34, if provided, may help operatively connect the axle assembly 10 to the second axle assembly 240. In at least one configuration, the output shaft 34 may extend along and may be rotatable about the drive pinion axis 60. For instance, the output shaft 34 may be supported by one or more roller bearings that may be disposed on the housing assembly 20 and may extend through the drive pinion 22. The output shaft 34 may be coupled to a side gear of the interaxle differential unit 32 at a first end and may be operatively connected to the second axle assembly 240 at the second end. For instance, the output shaft 34 may be fixedly coupled to an output yoke that in turn may be coupled to a connecting shaft, such as a prop shaft, which in turn may be operatively connected to an input of the second axle assembly 240. As such, the output shaft 34 and the output yoke may provide torque to the second axle assembly 240.

The axle assembly and differential assembly as described above may allow gear reduction to be provided within the differential assembly, which may allow gear reduction gear sets that are external to the differential assembly, such as an external planetary gear set, to be replaced or eliminated, which may reduce cost and weight. Moreover, replacing an external planetary gear set with an internal bevel gear reduction system may increase the speed reduction that may be provided, which may allow gear reduction downstream from the differential (e.g., a gear set provided at the wheel end assembly) to be eliminated, which may reduce cost, weight, and complexity. A bevel gear reduction unit may be more easily adapted to provide different gear ratios within a given package space, such as by varying the angle of the spider pins of the gear reduction unit and configurations or number of teeth on the first and second side gears. Thus, a bevel gear reduction system may provide more flexibility providing gear ratios or may provide an expanded gear reduction ratio range (e.g., higher gear ratios) as compared to a planetary gear arrangement having a fixed ring gear diameter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential assembly that includes:
        an outer housing that has a first side gear that is rotatable about an axis;
        an inner housing that is at least partially received inside the outer housing;
        a gear reduction unit that operatively connects the outer housing to the inner housing, wherein the gear reduction unit includes a spider that is fixedly disposed on the inner housing, a second side gear that is rotatable about the axis, and a pinion gear that is rotatably disposed on the spider and that meshes with the first side gear and the second side gear;
        a coupling that is moveable between a first position in which the coupling inhibits rotation of the first side gear with respect to the second side gear and a second position in which the coupling inhibits rotation of the spider with respect to the second side gear; and
        a differential nest that is at least partially received in the inner housing; and
    a first axle shaft and a second axle shaft that extend from the differential nest and are rotatable about the axis.

2. The axle assembly of claim 1 wherein the inner housing is rotatable about the axis with respect to the outer housing.

3. The axle assembly of claim 1 wherein the coupling is moveable along the axis and is at least partially received inside the outer housing and the inner housing.

4. The axle assembly of claim 1 wherein the first axle shaft extends through the coupling.

5. The axle assembly of claim 1 wherein the gear reduction unit is at least partially received in the inner housing and the outer housing.

6. The axle assembly of claim 1 wherein the outer housing includes a ring gear that receives torque from a drive pinion that is rotatable about a drive pinion axis.

7. The axle assembly of claim 6 wherein the gear reduction unit is at least partially received in the ring gear and the differential nest is not received in the ring gear.

8. The axle assembly of claim 6 wherein the outer housing includes a first outer housing and a second outer housing, wherein the ring gear is disposed between and is fixedly coupled to the first outer housing and the second outer housing.

9. The axle assembly of claim 8 wherein a clutch plate is fixedly coupled to the first outer housing and includes a spline that extends around the axis, wherein the coupling is coupled to the spline when the coupling is in the first position and is spaced apart from the spline when the coupling is in the second position.

10. The axle assembly of claim 9 wherein the coupling has a first coupling spline that faces away from the axis and extends away from the axis, wherein the first coupling spline meshes with the spline when the coupling is in the first position and is spaced apart from the spline when the coupling in in the second position.

11. The axle assembly of claim 9 wherein the first side gear is axially positioned between the spline and the spider.

12. The axle assembly of claim 9 further comprising an actuator that actuates the coupling between the first position and the second position, wherein the actuator is mounted to the clutch plate and receives the clutch plate.

13. An axle assembly comprising:
    a differential assembly that includes:
        an outer housing that has a first side gear that is rotatable about an axis;
        an inner housing that is partially received inside the outer housing and is rotatable about the axis;
        a gear reduction unit that operatively connects the first side gear to the inner housing;
        a differential nest that is at least partially received in the inner housing, wherein the differential nest is operatively connected to first and second axle shafts; and
        a coupling that is received in the gear reduction unit, wherein the inner housing is not rotatable about the axis with respect to the outer housing when the coupling is in a first position and the inner housing is rotatable about the axis with the outer housing when the coupling is in a second position.

14. The axle assembly of claim 13 wherein the gear reduction unit increases torque that is transmitted from the outer housing to the differential nest when the coupling is in the first position.

15. The axle assembly of claim 13 wherein the gear reduction unit includes:
    a spider that is fixedly disposed on the inner housing and has a spider hole;
    a second side gear that is rotatable about the axis and has a second side gear hole; and
    a pinion gear that is rotatably disposed on the spider and that meshes with the first side gear and the second side gear, wherein the coupling is received in the spider hole and the second side gear hole.

16. The axle assembly of claim 15 wherein the spider has a spider spline that is received in the spider hole and the second side gear has a second side gear spline that is received in the second side gear hole, wherein the coupling has a second coupling spline that meshes with the second side gear spline but not the spider spline when the coupling is in the first position and the second coupling spline meshes with the second side gear spline and the spider spline when the coupling is in the second position.

17. The axle assembly of claim 15 wherein the spider has a spider pin that extends at a first angle with respect to the axis and the pinion gear receives the spider pin.

18. The axle assembly of claim 17 wherein the differential nest includes:
- a differential spider that has a differential spider pin that is disposed at a second angle with respect to the axis that differs from the first angle and is fixedly coupled to the inner housing;
- a first differential side gear that is fixed to the first axle shaft;
- a second differential side gear that is fixed to the second axle shaft; and
- a differential pinion gear that is rotatable about the differential spider pin and meshes with the first differential side gear and the second differential side gear.

19. The differential nest of claim 18 wherein the spider pin that extends at an oblique angle with respect to the axis and the differential spider pin that is disposed perpendicular to the axis.

20. The axle assembly of claim 18 the pinion gear is not rotatable about the spider pin and the differential pinion gear is rotatable about the differential spider pin when the coupling is in the second position.

\* \* \* \* \*

UNITED STATES PATENT AND TRADEMARK OFFICE
CERTIFICATE OF CORRECTION

PATENT NO. : 10,975,942 B1
APPLICATION NO. : 16/598470
DATED : April 13, 2021
INVENTOR(S) : Rodrigo Soffner et al.

Page 1 of 1

It is certified that error appears in the above-identified patent and that said Letters Patent is hereby corrected as shown below:

In the Claims

Column 13, Lines 24-25, Claim 19:
After "wherein the spider pin"
Delete "that".

Column 13, Line 26, Claim 19:
After "the differential spider pin"
Delete "that".

Column 13, Line 28, Claim 20:
After "The axle assembly of claim 18"
Insert -- wherein --.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*